US007254564B2

(12) United States Patent
Coppola, Jr. et al.

(10) Patent No.: US 7,254,564 B2
(45) Date of Patent: Aug. 7, 2007

(54) NEURAL NETWORK BASED PREDICATION AND OPTIMIZATION FOR GROUNDWATER/SURFACE WATER SYSTEM

(76) Inventors: Emery J. Coppola, Jr., 610 Lawrence Rd., Lawrenceville, NJ (US) 08648; Mary M. Poulton, 4550 N. Sunset Hills La., Tucson, AZ (US) 85745; Ferenc Szidarovszky, 2650 W. Calle Cuero de Vaca, Tucson, AZ (US) 85745

( * ) Notice: Subject to any disclaimer, the term of this patent is extended or adjusted under 35 U.S.C. 154(b) by 311 days.

(21) Appl. No.: 10/277,595

(22) Filed: Oct. 22, 2002

(65) Prior Publication Data
US 2003/0078901 A1   Apr. 24, 2003

Related U.S. Application Data

(60) Provisional application No. 60/347,626, filed on Oct. 22, 2001.

(51) Int. Cl.
*G06E 1/00* (2006.01)
(52) U.S. Cl. .......................................... 706/21; 703/10
(58) Field of Classification Search ................. 706/21; 703/10
See application file for complete search history.

(56) References Cited

U.S. PATENT DOCUMENTS 5,468,088 A * 11/1995 Shoemaker et al. ........ 166/245
5,675,504 A * 10/1997 Serodes et al. ............... 702/25

OTHER PUBLICATIONS

"Optimization of groundwater remediation using artificial neural networks with parallel solute transport modeling", L. L. Rogers, F. U. Dowla; Earth Sciences Dept, Lawrence Livermore Natl Lab. Water Resources Res., vol. 30, No. 2, pp. 457-481, Feb. 1994.*
"A Neural Network based Parametrization Method for Distributed Parameter Identification", M. Sun & C. Zheng, System Theory, 1998. Proceedings of the Thirtieth Southeastern Symposium on Mar. 8-10, 1998, pp. 361-365.*
"Artificial Neural Networks in Hydrology. I: Preliminary Concepts", by ASCE Task Committee, Rao S. Govindaraju, Journal of Hydrologic Engineering, vol. 5, No. 2, Apr. 2000, pp. 115-123.*
"Artificial Neural Networks in Hydrology. II: Hydrologic Applications", by ASCE Task Committee, Rao S. Govindaraju, Journal of Hydrologic Engineering, vol. 5, No. 2, Apr. 2000, pp. 124-137.*
"Optimization of groundwater remediation using artificial neural networks with parallel solute transport modeling." Leah L. Rogers and Farid U. Dowla; Earth Sciences Dept., Lawrence Livermore National Laboratory, Livermore, CA. *Water Resources research.* vol. 30, No. 2, pp. 457-481. Feb. 1994.

(Continued)

*Primary Examiner*—David Vincent
*Assistant Examiner*—Mai T. Tran
(74) *Attorney, Agent, or Firm*—Lawrence R. Oremland, P.C.

(57) ABSTRACT

The present invention relates to a method and apparatus, based on the use of a neural network (NN), for (a) predicting important groundwater/surface water output/state variables, (b) optimizing groundwater/surface water control variables, and/or (c) sensitivity analysis, to identify physical relationships between input and output/state variables used to model the groundwater/surface water system or to analyze the performance parameters of the neural network.

9 Claims, 4 Drawing Sheets

OTHER PUBLICATIONS

"Artificial Neural Network Modeling of Water Table Depth Fluctuations." Paulin Coulibaly,[1,2] François Anctil,[3] Ramon Aravena,[4] and Bernard Bobee[1]. *Water Resources research*. vol. 37, No. 4, pp. 885-896, Apr. 2001.

"Optimization of Well Placement in a Gulf of Mexico Waterflooding Project." Baris Guyaguler, SPE, Roland N. Home, SPE, Leah Rogers, SPE, and Jacob J. Rosenzweig. Copyright 2000. *Society fo Petroleum Engineers Inc.* SPE 63221, pp. 1-10. This paper was prepared for presentation at the 2000 SPE Annual Technical Conference and Exhibition held in Dallas, TX, Oct. 1-4, 2000.

"Computational intelligence tools for groundwater management." M. Stundner, G. Zangl, *Listen and Talk—Environmental Services*, Baden, Austria. pp. 1-2.

"Use of Artificial neural networks and Fuzzy logic for integrated water management: Review of applications." Project report. *IHE Delft Hydroinformation*. Delft 2000. pp. 1-10.

"The Application of Artificial Neural Networks for the Predication of Water Quality of Polluted Aquifer." F. Gumrah, B. Oz, B. Guler and S. Evin. *Water, Air and Soil Pollution*. 119: pp. 275-294, 2000.

"Enhanced Water Management of Cascade Hydro System." T. Stokelj, D. Paravan, and R. Golob. Proceedings of the Lasted International Conference Power and Energy Systems. Sep. 19-22, 2000, Marbella, Spain. pp. 431-436.

"An Evaluation of a Neural-Network Method for Aquifer Hydraulic Conductivities Estimation." Charles S. Sawyer, Luke E.K. Achenie, and Karen K. Lieuallen. *Intelligent Engineering Systems Through Artificial Neural Networks*. vol. 4, Proceeding Intelligent Engineering Systems Through Artificial Neural Networks, St. Louis, MO, USA, pp. 13-16, Nov. 1994.

"Location Analysis in Ground-Water Remediation Using Neural Networks." Virginia M. Johnson and Leah L. Rogers, *Journal of Ground Water*. vol. 33, No. 5, pp. 749-758, Sep./Oct. 1995.

Slide Presentation (Determining Optimal Pumping Policies for a Public Supply Wellfield Using a Computational Neural Network with Linear Programming Paper No. H32D-03.

Dissertation by Emery Coppola entitled: Optimal Pumping Policy for a Public Supply Wellfield Using Computational Neural Network with Decision-Making Methodology.

* cited by examiner

General Flow Chart for NN Prediction Process
Applied to Groundwater/Surface Water Management Problems

Figure 3

General Flow Chart for NN Optimization Process
Applied to Groundwater/Surface Water Management Problems

Figure 4

General Flow Chart for NN Sensitivity Analysis Process
Applied to Groundwater/Surface Water Management Problems

NEURAL NETWORK BASED PREDICATION AND OPTIMIZATION FOR GROUNDWATER/SURFACE WATER SYSTEM

RELATED APPLICATION/CLAIM OF PRIORITY

This application is related to and claims priority from Provisional Application Ser. No. 60/347,626, filed Oct. 22, 2001.

INTRODUCTION

The present invention relates to a method and apparatus, based on the use of a neural network (NN), for (a) predicting important groundwater/surface water output/state variables, (b) optimizing groundwater/surface water control variables, and/or (c) sensitivity analysis, to identify physical relationships between input and output variables used to model the groundwater/surface water system or to analyze the performance parameters of the neural network.

BACKGROUND

Management and protection of water resources around the world is becoming critically important. Overuse and contamination combined with increasing water demand are diminishing the quantity and quality of water available for human use. It has been estimated that by year 2025, over 35% of the world population will face chronic water shortage problems. As a result, it is imperative that water resources are developed and managed in a sustainable and equitable manner.

Adverse environmental impacts like aquifer overdraft, saltwater intrusion, wetlands dewatering, stream flow depletion, and spreading of groundwater contamination are often consequences of improperly managed systems. Accurate prediction of the system states under variable control (e.g. pumping and injection rates) and random (e.g. precipitation and temperature) variables can help ameliorate many of these environmental problems. In addition, optimization can be applied to utilize the resource in the most cost-effective manner while ensuring sustainability.

Prediction

Computer models based on physical principles are traditionally used for simulation prediction and management of water resources. The predictions enable scientists and decision-makers to assess the impacts of various scenarios from which appropriate management policies can be developed and implemented. The effectiveness of the policies largely depends upon the accuracy of the model predictions. Typically, the modeler will attempt to accurately predict changes in the state variables of the resource as a result of the imposition of human control variables like pumping, and random variables like climate. For example, the computer model may be used to assess the potential impact of municipal well pumping on water levels near wetlands and flows in streams during drought conditions. The nature and extent of the pumping and climate impacts will depend upon the physical attributes of the groundwater/surface water system. For a physical-based computer model to accurately predict changes of the state variables in response to control and random variables, the equations must adequately represent the conditions and processes of the physical system under study.

Following development of physical-based models, they are often linked with or embedded into optimization programs to identify the "optimal" control policy. For the example water management example above, this might be maximizing pumping of the supply wells without dewatering wetlands or depleting stream flows.

The most advanced physical-based models for predicting state variables are expressed by numerical equations. Numerical groundwater/surface water models use the laws of conservation of mass and momentum to solve for the distribution of water levels or head across the study area of interest. Once the energy field is computed numerically, the groundwater/surface water model can make other predictions such as hydraulic gradients, groundwater flow velocities (direction and magnitude), fluxes into or out of surface water bodies, and the fate and transport of contaminants, etc. Because numerical models embody the physics of flow within the numerical equations, the physical properties of the system, as well as the boundary and initial conditions, must be adequately represented by the model to achieve an acceptable degree of accuracy.

Groundwater/surface water properties are by nature extremely heterogeneous, exhibiting tremendous spatial variability (e.g. hydraulic conductivity values in nature range over 14 orders of magnitude) in values over very short distances. Because of the expenses associated with quantifying these properties, typically a very limited number of field and/or laboratory measurements are made. Except under relatively ideal hydrogeologic conditions, assigning a "representative" distribution of these parameters across a model grid can be a difficult if not impossible task. As a result, small-scale features (e.g. lenses or fractures) that can have a significant effect on local or even regional flow regimes are rarely known, much less incorporated into the numerical model. Even stochastic approaches, which attempt to model the natural heterogeneity of the subsurface conditions, have limited application to real-world conditions because of simplifying mathematical assumptions and relatively sparse field information.

Because of the inherent difficulty of determining a priori a set of representative model parameter values across the grid, calibration has become a standard component of model development. This consists of systematically adjusting model parameter values to reduce the error between the computer simulated and field-measured water levels. To eliminate the tedious trial and error calibration process, inverse modeling has been used.

Discretization of the numerical model domain into a finite number of cells or elements limits the degree of surface/subsurface heterogeneity that can be captured by any model. Within each cell, a single value for each model parameter must be assigned. In reality, real-world property values (e.g. hydraulic conductivity, river bed leakance, etc.) as represented by the model parameters change over the microscale.

In addition, because of layering and structural features the hydraulic conductivity field in most geologic systems is inherently anisotropic (directionally dependent). In many modeling efforts isotropy is often assumed, despite the fact that anisotropy can exert significant control on the flow field. In other cases a simple heuristic is assumed and adopted during model calibration without field or laboratory test validation.

Initial conditions refer to the head distribution across the model domain at the beginning of a simulation. We select initial conditions as the final steady state head field for the calibrated model under average hydrologic conditions. In other cases, the final head field for a transient (time dependent) simulation may be used. Regardless, there will always be an inherent amount of error between initial conditions assigned to the model and the real-world initial conditions, serving as an additional source of prediction error.

Boundary conditions are physical boundaries such as impermeable rock or large bodies of surface water. They can be extremely difficult to quantify (e.g. mountain front recharge) and as in the real world they largely determine the pattern of flow in the model. As with initial conditions, discrepancies between assigned and real-world boundary conditions contribute to prediction error, particularly during transient simulations.

A more fundamental modeling problem may arise if the physical assumptions of the numerical model as represented by its equations do not match the natural system. Conventional groundwater flow models such as MODFLOW (developed by the United States Geological Survey) are constructed under conditions that do not hold necessarily in practical cases (e.g. non-Darcian flow, fractured rock and karstic environments, etc.). The effect of underlying simplifying assumptions cannot be foreseen. Hence model accuracy is questionable. However, the simplifying assumptions make the problem solvable, which is why they continue to be applied in practice. Consequently, numerical groundwater flow models are susceptible to producing relatively large predictive errors of water levels and other variables. This in turns affects the simulation accuracy of predictions made using traditional groundwater/surface water models, and can compromise sound resource management decisions.

The present invention, which is based on a neural network (NN) approach, overcomes problems associated with traditional physical-based models by accurately predicting groundwater/surface water behavior of interest independent of knowledge regarding expensive and difficult to quantify physical parameters, such as hydraulic conductivity, riverbed thickness, riverbed slope, and storativity. In addition, modeling problems associated with adequate characterization of both boundary and initial conditions and anisotropy are avoided.

The NN approach uses relatively easily measurable variables such as water levels, pumping rates, precipitation, and temperature to learn the behavior of interest for the groundwater/surface water system. In addition, the NN equations serve as a highly accurate physical-system simulator, and can be coupled with or embedded into an optimization program for the purpose of identifying the optimal management solution. Because of its flexibility and computational speed, the NN can be used to make predictions and manage the resource in real-time. This can be automated by interfacing or coupling the NN/optimizer with a real-time, on-line automated data collection system (e.g. Supervisory Control and Data Acquisition System, SCADA) or other type of remote data collection and control network.

Optimazation

There are problems associated with optimization using numerical models, the difficulties of which are discussed below. The present invention overcomes these limitations. Typical groundwater/surface water hydraulic management optimization models can be classified into the embedding method and the response matrix approach.

In the embedding method, the numerical approximations of the governing groundwater flow equations are embedded into a linear program as part of the constraint set. For the confined aquifer case, the governing equations are linear and complications are therefore avoided. However, for the unconfined case, the equations are treated as linear with respect to the square of the hydraulic head. This approach has been applied to both steady (single management period) and transient (multiple time-period) cases. A major disadvantage of this method is that the size of the constraint matrix can become extremely large.

Alternatively, the response matrix approach is the most common technique because of its computational efficiency. With this technique, the unit response to a unit pulse of stress is numerically computed for all possible stresses at all points of interest in the aquifer. These unit responses, which in groundwater problems typically represent the derivative of head with respect to pumping, are called response coefficients. The response coefficients are collected into a response matrix, which is used explicitly to formulate the optimization problem.

Particular care, however, must be exercised when applying the response matrix approach to unconfined aquifers. Unlike the confined aquifer case, where system linearity ensures response coefficient values independent of the perturbation value (e.g. pumping increment), response coefficients for the unconfined (water table) aquifer are sensitive to the perturbation value. Because of system nonlinearity, perturbation for the unconfined case requires small increments in pumping to achieve reasonable accuracy. However, as it is well known from numerical analysis small step size in numerical differentiation results in high round off error.

A powerful advantage for performing optimization with the NN approach is that its derived equations, whether linear or non-linear in form, can be easily embedded into or coupled to an optimization solver for management purposes. Because the NN concentrates on input-output (as specified later in the document) relations which can be represented by a much smaller number of variables and equations than a physical based computer model, optimization for the management solution will be significantly less computationally complicated and expensive and numerical round-off errors associated with the response coefficient method and huge constraint sets are avoided.

The NN/Optimizer can be interfaced directly with data acquisition/database systems. Automatic data collection and database systems are already used in water resources management for storing data. NNs are perfectly suited for using this historical data for making accurate real-time predictions and management decisions.

Sensitivity

Sensitivity analysis is also a useful component for effective water resources management. It is often the goal of the modeler and decision-makers to identify strong cause and effect relationships in the system. For example, decision-makers may want to assess the relative impacts of pumping and climate on water levels in the aquifer. However, non-uniqueness of the solutions in physical-based models makes it difficult to evaluate the sensitivity of different factors on the modeled system. For example, reducing transmissivity values across the model domain can compensate for decreasing a real recharge rates from precipitation.

Because the NN does not explicitly model the physics of flow, the sensitivity analysis of non-aquifer variables is simplified because the hydrogeologic parameters inherent to the physical-based model are eliminated. By systematically eliminating or disabling input variables in the NN, the relative effect of each variable on the various output variables can be quantified and assessed. This provides a better understanding of the natural system, which may facilitate design of a more effective hydrologic monitoring and data collection system. The sensitivity analysis results can also improve development and calibration of physical-based models by identifying important input-output calibration pairs (e.g. areal recharge rates on water levels in an unconfined aquifer).

The NN equations can also be combined with interpolation (e.g. kriging) and physical-based equations for predicting important physical variables and dynamics. Thus, the accurate predictions made with the NN can be used as data for interpolation or physical-based models, expanding and improving prediction capability.

In summary, the NN will in many instances achieve considerably more accurate predictive results with less developmental effort and cost than traditional physical based models. They are powerful tools for conducting sensitivity analyses that provide insight into the physical processes of the groundwater/surface water system, and for identifying important cause and effect relationships. They can be embedded as a module in optimization procedures for computing superior management solutions for scarce and vulnerable water resources. They are also ideally suited for automated data collection and management systems.

SUMMARY OF THE INVENTION

The present invention provides a new and useful method and apparatus for overcoming the previously discussed types of problems. The present invention provides a neural network designed to do any of the following (a) predicting important groundwater/surface water-related output/state variables, (b) optimizing groundwater/surface water-related control variables, and/or (c) providing sensitivity analysis to identify physical relationships between input and output variables for the groundwater/surface water system or to analyze the performance parameters of the neural network.

In addition, the preferred version(s) of the present invention can provide the following additional benefits:

(a) The sensitivity analysis of the neural network system provides a better understanding of the natural system and can facilitate the design of a more effective and cost efficient data monitoring and collection system for hydrologic data. The sensitivity analysis results may also be used to improve a numerical model by identifying the interrelations between variables (e.g. precipitation and water levels).

(b) The neural network uses fewer variables and more easily measured or simulated data (e.g. temperature and precipitation as surrogates for evapotranspiration and recharge rates) without sacrificing predictive accuracy.

(c) Highly spatially variable (heterogeneous) and directionally dependent (anisotropic) physical properties, such as river bed thickness and hydraulic conductivity, which are difficult to quantify, are not required by the neural network for accurately predicting output/state variables. Highly spatially and time variable properties (e.g. soil-moisture deficit and evapotranspiration) that are difficult to quantify are also not required by the neural network for accurately predicting output/state variables (d) Accurate characterization and quantification of boundary conditions are not required by the NN for accurately predicting output/state variables.

(e) The neural network system is well suited for using real-time on-line data to initialize the state-transition equations increasing predictive accuracy.

(f) The neural network system serves as a data-driven model for automated data collection systems (e.g. SCADA systems) that collect and store large amounts of hydrologic data.

(g) The neural network derived transition equations can be used to conduct formal optimization in real time using on-line automated data collection systems. The system is able to react adaptively to new data and information and can update optimal solutions on-line.

(h) The neural network can be used to manage a joint surface water/groundwater system that is interconnected by water transfer.

(i) The neural network is an excellent tool for identifying data errors.

Further features of the present invention will become further apparent from the following detailed description and the accompanying drawings.

DETAILED DESCRIPTION

As described above, the present invention provides a new and useful method and apparatus, based on the use of a neural network, for (a) predicting important groundwater/surface water output/state variables, (b) optimizing groundwater/surface water control variables, and/or (c) sensitivity analysis to identify variable interdependence and physical relationships between input and output. The principles of the present invention are described below in connection with a neural network designed to predict output/state variables and/or optimizing system control in a groundwater/surface water system. However, from the description, the manner in which the principles of the present invention can be used for various functions in a groundwater/surface water system will be apparent to those in the art.

The invention uses neural network technology for the difficult problem of modeling, predicting, and managing hydrologic output/state variables (e.g. stream flow rates, surface water levels, head or groundwater levels, hydraulic gradients, groundwater velocities, drawdowns and water levels in pumping wells, water quality data, water demand, etc.) in groundwater/surface water systems. All computed variables referenced in this document, will be called output variables. The output variables, which reflect the groundwater/surface water system and its properties, are referred to as state variables (e.g. groundwater elevation is a state variable, water demand based on climate conditions is an output but not a state variable). Input and output data in the system comprises hydrologic, meteorological, control and water quality data. Hydrologic data comprises transmissivity, hydraulic conductivity, storativity, specific yield, porosity, effective porosity, aquifer thickness, leakance, leakance factor, stream flow rates, stream and riverbed thickness, slope of riverbed, surface water levels, head and groundwater levels, hydraulic gradient, drawdowns in pumping wells, natural areal recharge, groundwater and surface water velocity, discharge, and soil moisture. Meteorological data comprises precipitation, wind speed, temperature, humidity, barometric pressure, and dew point. Control data comprises pumping and injection rates of wells, surface water releases, discharge rates into natural (e.g. springs) or man-made (e.g. spreading basin) features, and extraction rates from natural or man-made features. Water quality data comprises natural and synthetic chemical constituents, organic constituents (e.g. bacteria, viruses), temperature, pH, electrical conductivity, and gas content. Using inputs that may comprise state (e.g. initial groundwater level, surface water level, stream discharge, water quality conditions), decision or control (e.g. pumping data, controlled releases of surface water, etc.), and random variables (e.g. precipitation and temperature) collected from the groundwater/surface water system with automatic data collection systems (e.g. SCADA or Supervisory Control and Data Acquisition) or other means (e.g. manual), a neural network is trained to predict the output variables of interest.

The equations derived from the developed neural network can be embedded into or coupled with an optimization program to identify the optimal management solution for the resource via control variables (e.g. pumping wells). The neural network with (or without) the optimization system can be coupled to an automated control/data collection/database system for real-time modeling, prediction, and management of groundwater/surface water system In addition, the neural network can be used to conduct a sensitivity analysis to quantify and assess the effect of the various input variables, including human actions, on the output variables.

Initially, it is believed useful to describe certain underlying principles of a neural network, its construction and usage, and to describe the manner in which prediction of output/state variables and/or optimization system control can be important in a groundwater/surface water system. It will also be apparent to those in the art that the principles of the present invention can be implemented on standard PC equipment.

A neural network is described by its architecture and learning algorithm. The architecture is described by the fundamental components of processing elements (PEs), connection weights and layers and the way each component interacts with the others. A connection strategy refers to the way layers and PEs within layers are connected. A feed-forward strategy means that layers are connected to other layers in one direction, from the input to the output layer. A feedback strategy means that some or all of the layers have changeable connections that go back to a previous layer (e.g. from the first hidden layer to the input layer). A fully connected strategy means that every PE in a layer is connected to every PE in another layer.

The learning strategy refers to how the network is trained, (e.g. the functional relations of the interconnecting weights are calibrated). In supervised learning you must provide input/output pairs. The output patterns that you provide are compared to the output that the network computes and any difference between the two must be accounted for by changing parameters in the network. In the simplest implementation of a network, the delta rule is used to update the parameters (e.g. weights):

$$\text{parameter}_{new} = \text{parameter}_{old} + 2\eta\epsilon x, \quad (1)$$

where $\eta$ is a positive constant, $\epsilon$ is an error term, and x is an input value.

In unsupervised learning the network is provided only with input patterns and it finds common features in groups of those patterns.

Figure 1:
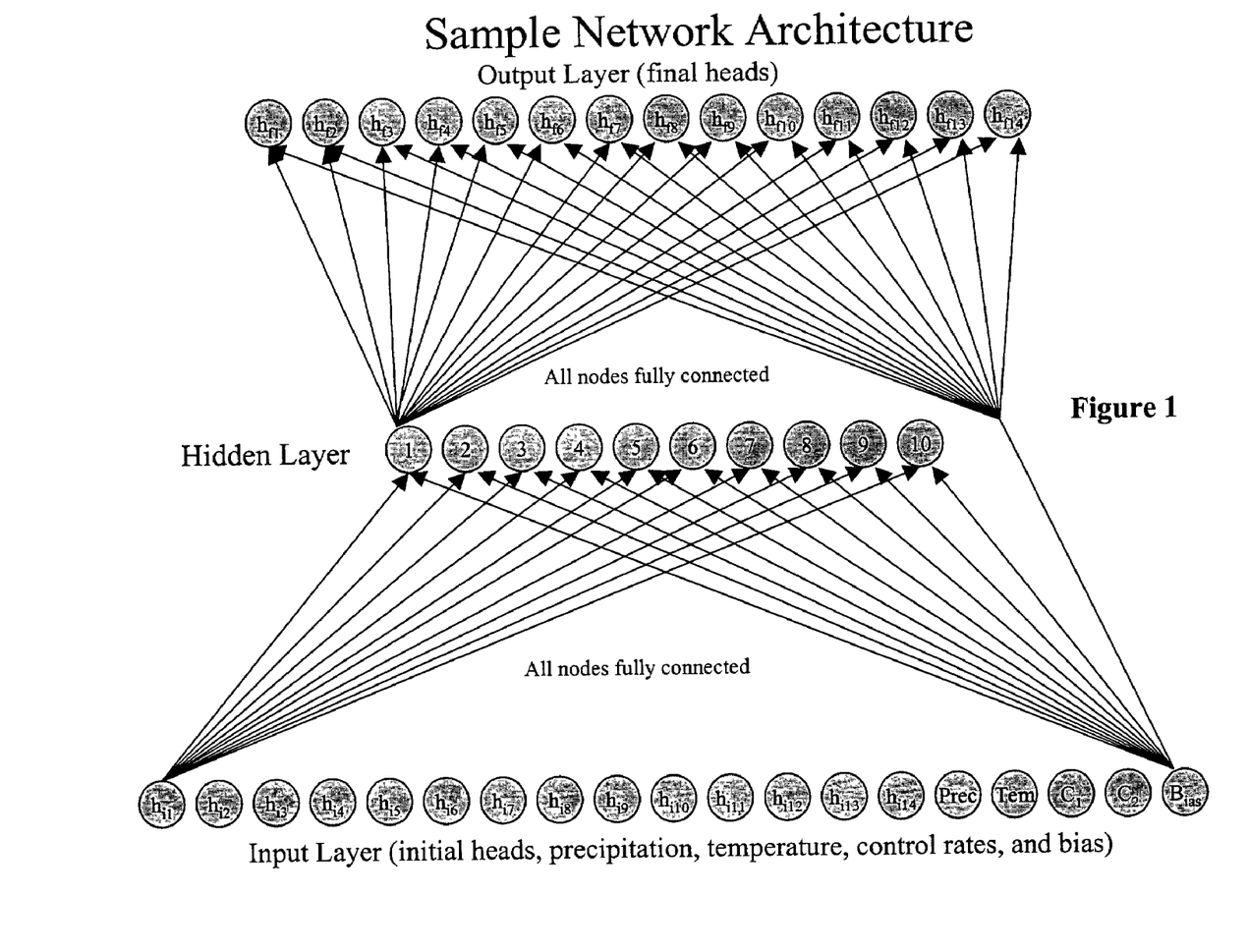
FIG. 1 is a schematic illustration of one type of neural network architecture that can be used in a method and/or apparatus according to the present invention.

Back-error propagation or back-propagation is the most widely used type of neural network today. In its most common configuration, the back-propagation network has three layers: an input layer, a single hidden layer, and an output layer. Such an example is shown in FIG. 1. An additional PE called a bias unit is also included. The first layer receives the input from the training file. Each pattern contains a fixed number of input and output elements. The number of input and output PEs is dictated by the problem being solved. The cycle of applying an input, calculating an output, computing an error, and changing the weights constitutes one iteration of the network as outlined below.

The value received by each PE is multiplied by an associated connection weight:

$$Sum_j = \sum_{i=1}^{n} w_{ji} x_i + w_{jb}, \quad (2)$$

where $Sum_j$ represents the weighted sum for a PE j in the hidden layer. The connection weight vector $\vec{w}$ represents all the connections weights between a PE in the hidden layer and all of the input PEs $x_i$. The input vector $\vec{x}$ contains one element for each value in the training pattern. The bias unit is added as the connection weight $w_{jb}$ since the bias has a constant input value of 1.0.

At a PE in the next or hidden layer all products are summed. This is called the output of the PE. The output is passed through a threshold function and this becomes the activation ($act_j$) of the PE $$act_j = f_j(Sum_j) \quad (3)$$

The threshold function is typically represented by the sigmoid function, $$f_j(Sum_j) = \frac{1}{1 + e^{-Sum_j}}, \quad (4)$$

the hyperbolic tangent function, $$f_j(Sum_j) = \frac{e^{Sum_j} - e^{-Sum_j}}{e^{Sum_j} + e^{-Sum_j}}, \quad (5)$$

or in special cases by linear output functions.

For each pair of consecutive layers equations (2) through (5) are used.

The connection weights in the net start with random values so initially the calculated output will not match the desired output given in the training file. The connection weights are iteratively updated in proportion to the error.

The proportional error estimate for the output layer PE k for training pattern p is given as the difference between the desired output $d_{pk}$ from the training set and the NN calculated output $o_{pk}$ multiplied by the derivative of the threshold function $$\delta_{pk} = (d_{pk} - o_{pk}) f_k'(\text{Sum}_{pk}). \quad (6)$$

The proportional error estimate for the hidden layer is given as $$\delta_{pj} = f_j'(\text{Sum}_{pj}) \sum_k \delta_{pk} w_{kj}. \quad (7)$$

Once we know the errors we use a learning rule to change the weights in proportion to the error with a step size A. The delta rule in equation (1) is applied to the output layer PEs for each input pattern, and the new connections weights between the hidden and output layers take on the values of $$w_{kj}^{new} = w_{kj}^{old} + \eta \delta_{pk} \, ac_{pj}, \quad (8)$$

and the connections weights between the input and hidden layers become $$w_{ji}^{new} = w_{ji}^{old} + \eta \delta_{pj} x_{pi}. \quad (9)$$

After the weights are changed we re-apply the inputs and repeat the whole process. If new data become available training can be repeated and the NN weights can be adaptively and continuously updated. Training stops at the user's discretion, when the error on the test data begins to increase, or when the training error reaches a desired minimum error level.

There are several alternative architectures and learning algorithms that can be used within a neural network system. Alternative learning algorithms employed comprise directed random search, extended delta-bar-delta, conjugate gradient, Levenberg-Marquardt, generalized Newton's method, and generalized regression method. Alternative architectures used comprise self-organizing maps, radial basis functions, modular networks, recurrent and time delay neural networks, and probabilistic neural networks.

Figure 2:
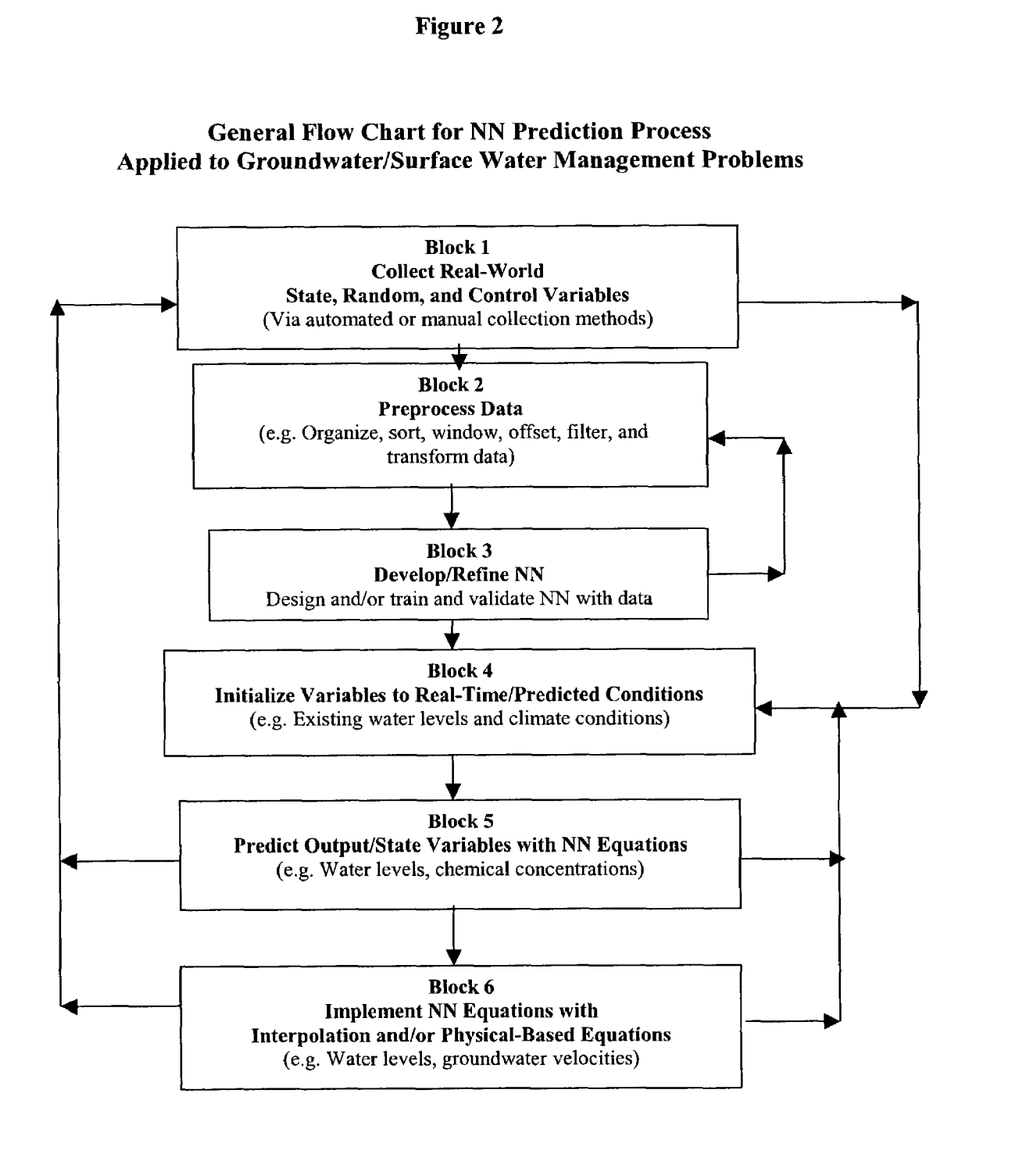
FIG. 2 is a schematic illustration of an apparatus and its operation for prediction of output/state variables for a groundwater/surface water system, according to the principles of the present invention.

FIG. 2 illustrates certain basic principles of a system or method of the present invention, for predicting output/state variables in a groundwater/surface water system.

In Block 1 data collection is shown. Data can be obtained by manual collection, simulation or on-line real-time automated data collection system (e.g. SCADA).

Block 2 shows the pre-processing step that includes organizing, sorting, windowing, offsetting, filtering, and transforming data.

Windowing of training data is a means for increasing the amount of available data. This requires use of stress periods of variable length, which in itself (i.e. stress period length) would serve as an input to the NN. A stress period is defined in this document as time during which control and random variables remain constant. For example, assume groundwater levels were collected in all monitoring wells on the dates January 1, January 7, January 14, and January 21 of the same year, with pumping data and climate data available over this period. Then, measured water levels collected January 1 constitute the "initial" groundwater levels and are separately paired with data for January 7, January 14, and January 21 to form three distinct training records (i.e. January 1-January 7, January 1-January 14, January 1-January 21). Thus, all three training records share the same initial water level values. Each record, however, has different NN input values corresponding to the pumping rates and climate conditions for these records (e.g. obviously a 3 week period will have more total precipitation than a one week period) and the stress period length (i.e. 7 days, 14 days, 21 days). The values of the output variables are also different for the three training records because the outputs represent the groundwater levels observed at the end of the stress period of record.

In cases where water levels are collected manually, and thus relatively infrequently, data windowing may be more important than in cases where data is collected automatically and at higher frequency.

For cases where data is collected frequently and continuously, for example hourly, offsetting can generate large data sets. Consecutive 24-hour periods would simply be offset by one hour, particularly when hourly climate data exists. In this manner, each day does not represent a calendar day, but a discrete and unique 24-hour time period. In addition, this method could be combined with windowing for variable length stress periods.

Select input variables may also be transformed for NN simplification (fewer input variables) while accounting for lag-time effects of input variables on final output variables. For example, for predicting water level changes over 7 day stress periods, the daily pumping rates and precipitation values can be weighted in time, with proportionately higher weight given to values on days closer to the end of the stress period. The sum of the seven daily weighted values represents the input value for the variable. In equation form, the transformed time weighted pumping rate may be expressed as $$P' = \sum_{t=1}^{t=L} P_t / [(L+1) - t] \quad (10)$$

where $P_t$ is the mean daily pumping rate on day t in the stress period, and L is the total length of the stress period.

Note from FIG. 2 (Block 2, Block 3) that preprocessing the data and NN development/refinement is an iterative feedback process. For example, the NN can serve as an excellent screener for data errors. For a large public supply wellfield case, during network validation, the NN produced water level predictions with high errors. These outliers were found to correspond with data records that contained transcription errors.

As shown in Block 3, the neural network is designed and trained as previously discussed. The results of the training process are the transition equations that are then validated by additional data not included in the training process.

During refinement, different data sets and combinations of input and output variables can be tried to identify a NN design that achieves lowest predictive errors for the output variables of interest. For example, it may be found that developing a separate NN for each output/state variable may produce lowest prediction errors. Thus, the input variables could remain constant for all NNs, with each NN having just one output/state variable, such as the water level at a single location.

Note the general flow process showing that as new data become available, the NN is redesigned (new inputs/outputs) and/or retrained. This can be performed at select time intervals and (e.g. monthly) and/or when new extreme system conditions occur (e.g. 100-year storm). This updating process ensures NN robustness.

In Block 4 we show the initialization process of some time dependent input/output variables. For the first stress period prediction, these variables are initialized to real-time conditions. For predictions made over subsequent multiple consecutive stress periods, the initial condition for each time window is taken as the end condition of the previous time window, which is computed by the trained NN. This process is illustrated by the feedback process from Block 5 to Block 4. For example, the real-time groundwater levels in the aquifer and climate conditions can be used to initialize the NN. The NN can then be used to make a single stress period prediction or multiple consecutive stress period predictions (i.e. feedback) over a management period of interest.

Block 5 shows prediction of output/state variables as computed by the NN equations. Separate and distinct NNs can be used to predict final output/state variables. The NN equations can also be collectively embedded into or linked to an optimization program to identify optimal control solutions. This is particularly relevant in cases where predicting new output/state variables is important, such as water levels measured in a new observation well. Water level data would need to be collected from the new observation well. By using separate networks for each well, however, the previously collected data in conjunction with new data can be used to train networks to predict output water level states for previously existing observation wells. For the new observation well, obviously only the new data can be used since this is the only data for which water level measurements of the new well were collected. Still, the "old" observation well data can still be used for NNs corresponding to the previously existing observation wells.

In Block 6 we show the option of using the NN equations to predict output/state variables between sampling points with interpolation equations (e.g. head or water levels). Also, other output states (e.g. groundwater velocity) that are not explicitly computed by the NN can be predicted by processing the NN predictions (and other necessary data) through physical based equations. Note that these predictions can also be performed over multiple consecutive stress periods, as shown by the feedback from Block 6 to Block 4.

For example, the NN can be coupled with interpolation equations to delineate detailed two and three-dimensional head (energy) fields. That is, water levels can be estimated across a study area by interpolating NN predicted water levels. The dynamics of the groundwater system can then be further defined by coupling the NN/interpolated derived head field with a physical-based equation(s) to enable a more detailed analysis. For example, following delineation of the head field, groundwater velocities can be computed at points of interest with Darcy's Law by inputting the delineated hydraulic gradient with the assumed hydraulic conductivity values. In the same manner, particle tracking or water budgets calculations could also be performed.

If a new control variable is added to the system, such as a pumping well, new data would have to be collected to include the pumping rates of the new and existing pumping wells, and the corresponding water level responses measured at locations of interest. This is necessary because the new well induces new stresses and corresponding system responses not previously observed and measured. However, the old data that proceeds the new pumping well may still be used in many (if not most) groundwater situations. One would simply add a new pumping rate input variable to the neural networks. This variable would represent the pumping rate of the new well. For all records collected before the new pumping well existed, a zero pumping rate would be inputted into the neural network as the input value for this well. For all data collected subsequent to installation and operation of the new well, the actual recorded pumping rates for this well would be inputted. Again, this allows preservation of the "old" data collected previous to installation of the new pumping well(s).

As with the water level inputs, it may be that certain pumping wells do not affect water levels at certain observation well locations, and the pumping wells could be excluded from the corresponding neural networks. An obvious example of this is a multilayered unconfined and confined groundwater system, where pumping of one aquifer does not measurably affect water levels in the other. Again, separate and distinct NNs containing different control inputs will not affect formal optimization.

For demonstrating some of the features claimed and discussed above, two test cases are presented. In the first, a NN was trained to predict transient water levels at 12 monitoring well locations screened at various depths in response to changing pumping and climate conditions in a complicated multi-layered sand and limestone aquifer system. The trained NN was validated with ten sequential 7-day periods, and the results were compared against both measured and numerically simulated water levels. The absolute mean error between the NN predicted and the measured water levels is 0.16 meters, compared to the 0.85 meters absolute mean error achieved with an extensively developed and calibrated numerical flow model over the same time period. More importantly, unlike the numerical model, the NN accurately mimicked the dynamic water level responses to pumping and recharge in the complicated multi-layered groundwater system.

As a further check for robustness, the NN's ability to accurately predict water level changes over multiple consecutive stress periods without using measured water levels for state re-initialization was assessed. That is, measured water levels were used only for initialization of the NN at the start of the 71-day validation period (from Feb. 4, 1998 to Apr. 15, 1998). All initial water level (state) inputs used by the NN for subsequent stress periods were predictions made for the corresponding previous stress period. Minimal degradation in predictive results from the continuously real-time initialized NN occurred. The mean absolute error increasing marginally from 0.16 to 0.18 meters. These results demonstrate that a NN can be used for accurately predicting the evolution of water level changes over extended planning horizons using multiple consecutive stress periods. That the predictive accuracy of the NN exhibited relatively little degradation with time over the 2.5-month validation period suggests that the planning horizon could be extended without significant loss in accuracy.

Similarly impressive results were obtained for predicting water levels in eleven large capacity public supply wells (>1,000 gpm) at the end of 24 hour pumping periods. Hourly stress periods were used, and SCADA measured water level values were used only at time 0 to initialize the NN, and the NN generated water levels were then used to reinitialize the water levels for each subsequent time step. This sequential processing of the NN generated water levels was performed over a 24-hour period. Even though water level changes ranged over 40 feet or more in each of the eleven wells, the NN accurately predicted the water level changes and achieved an average prediction error of less than 1 percent. Equally important, the percent errors did not increase with time; in fact, in many cases, after a relatively large error (2%), they would drop significantly and remain stable through the $24^{th}$ hour. The implication of this error stability is that accurate water level predictions can be carried out over relatively longer time periods with no or minimal expected loss in predictive accuracy. A benefit is that longertermed aquifer impacts from pumping and climate conditions can also be predicted and assessed with confidence.

When predicting states over different prediction or planning horizons, different stress period lengths should be tried to achieve best possible predictive accuracy. Specifically, different NNs can be developed and trained for different stress period lengths (e.g. hourly, daily, weekly, etc.), and their performances compared over different prediction or planning horizons. For example, weekly stress periods may perform better than daily ones for making monthly predictions. An alternative is to train the NN with variable length stress periods, with the length of the stress period used as an input to the NN.

Figure 3:
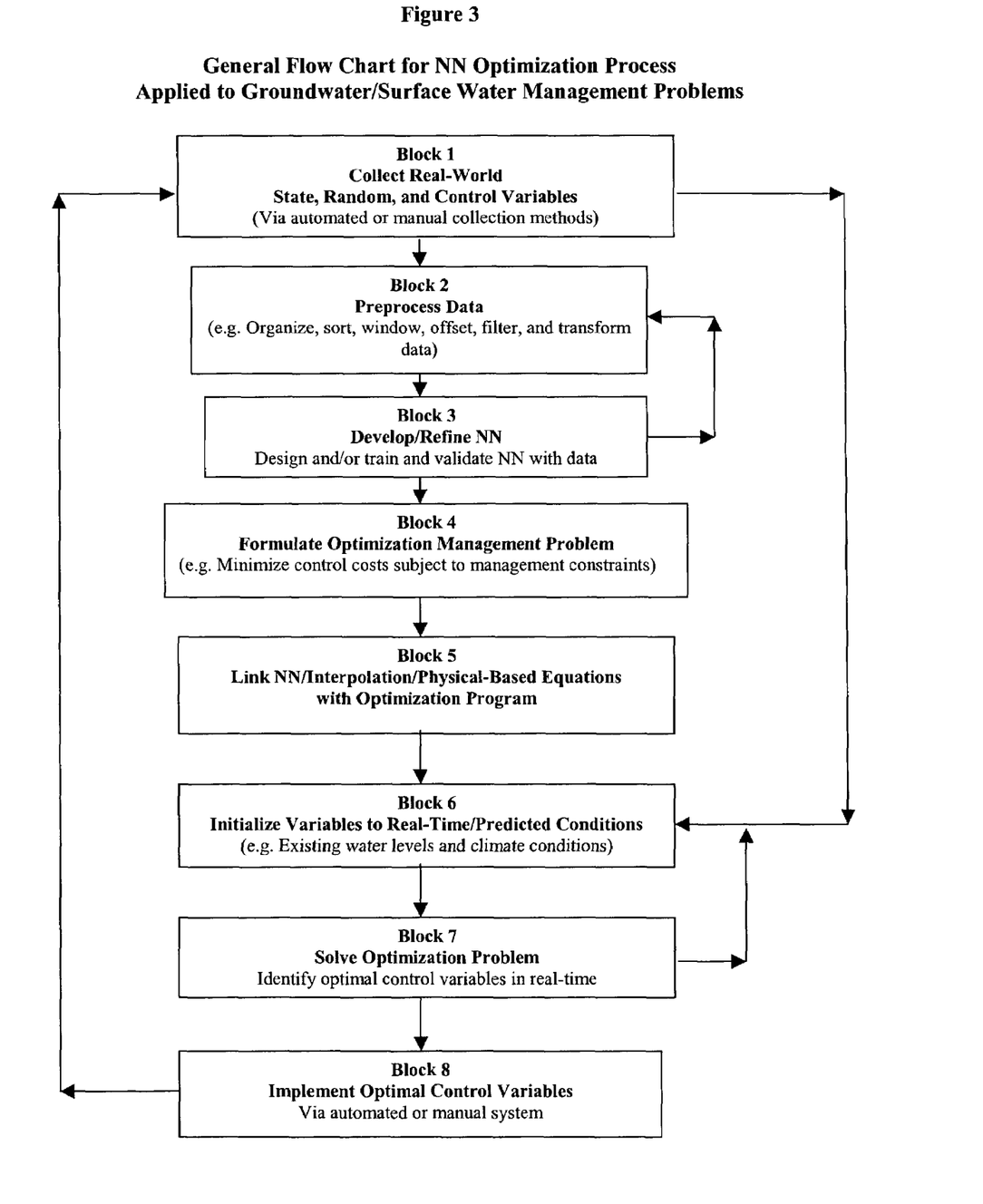
FIG. 3 is a schematic illustration of an apparatus and its operation for an optimization procedure for a groundwater/surface water system, according to the principles of the present invention.

FIG. 3 illustrates certain basic principles of a system or method of the present invention, for optimization.

The NN equations can be embedded into any optimization model regardless if one or more objective functions are optimized. These constraints guarantee that any solution is physically feasible and reasonable.

In the system and method of FIG. 3, the Blocks 1-3 are the same as in FIG. 2. In FIG. 2 prediction and implementation with interpolation and/or physical based equations feedback to Block 1, and in FIG. 3 the implementation of the optimal control variables also feeds back to Block 1.

Block 4 shows construction of the mathematical model for optimization. This model comprises the physical constraints, the NN transition equations, as well as the objective functions. In the case of multiple objectives the mathematical model also comprises the solution concept that will be discussed later.

Block 5 shows the embedding of the neural network transition equations into the optimization model. As depicted, the difference between FIGS. 2 and 3 is the optimization component. As FIG. 3 shows, the NN equations in conjunction with interpolation and/or physical-based equations, as shown in block 5, can be simultaneously embedded into an optimization program to represent system-behavior of interest. These equations would represent the state-transition equations for the real-world system. The optimization management problem is formulated with an objective function and management constraint set. The objective function, such as minimizing pumping cost is expressed as a function of the control variables. Typical management constraints include minimum and maximum groundwater and surface water levels. The constraints are a function of some combination of state, decision, and random variables. Solution of the optimization problem would identify the optimal values for the control variables for maximizing or minimizing the desired objective function without violating any of the imposed constraints.

Block 6 is similar to Block 4 of FIG. 2. In FIG. 2 there is a feedback from Block 5 to Block 4, and in FIG. 3 a similar feedback is from Block 7 to Block 6.

Block 7 illustrates the optimization algorithm that is problem dependent.

After the NN weights are determined by training, the transition equations are embedded into the optimization model as constraints. If all transition equations are linear then all constraints are also linear, otherwise they are non-linear. The optimization management formulation can then be solved with a variety of methods to identify the optimal values of the decision variables that either maximizes or minimizes the objective function without violating the imposed constraints. In a linear optimization problem, the optimal solution (assuming feasibility) is the global optimum. In non-linear optimization, convergence to the global optimum is not guaranteed, and the expected outcome is the so-called local optimum. In both cases, if the neural network's transition equations more accurately predict the natural system's behavior of interest than the numerical model, then the optimal solution identified with the NN equations should on average be closer to the real-world optimum than the solution identified using the numerical model. The optimal solution can then be implemented in real-time. The optimization can also be conducted over multiple consecutive stress periods, with reinitialization of subsequent stress period conditions performed within the optimization solver. This is depicted by the feedback loop from Block 7 to Block 6.

If there is only one criterion to be optimized (such as pumping rate or cost) then any single-objective optimization method can be used to solve the resulting single-objective optimization problem. If there are multiple objectives (such as pumping rate and water level gradient as the measure of health risk), then the following procedure is used. First the Pareto-set is determined which represents those decision alternatives that cannot be improved simultaneously in all objectives. It can be obtained by optimizing a linear combination of the objectives with varying weights. After the Pareto set is determined, then a file containing its points will replace all constraints and the point with minimal distance from the ideal point, which has the best values of the objectives in its elements, is determined. If $(p_1^*, p_2^*)$ is the ideal point and $(p_1, p_2)$ is any point of the Pareto-set, then with any $\alpha \geq 1$ and weights $c_1, c_2 > 0$ we can use the distance $$\{c_1|p_1^* - p_1|^\alpha + c_2|p_2^* - p_2|^\alpha\}^{\frac{1}{\alpha}}. \tag{11}$$

Alternatively instead of minimizing distance from the ideal point conflict resolution methods can be used. Let $(p_1^\ast, p_2^\ast)$ be the point having the worst possible objective values in its elements. Then we can maximize the distance (11) from this point or maximize the Nash product:

$$|p_1 - p_{1*}|^{c_1}|p_2 - p_2^*|^{c_2}, \tag{12}$$

or maximize the improvement from this worst outcome point in a given direction, where the direction depends on the relative importance of the objectives. As an alternative method we might find the point that has equal weighted distances from the best values of the different objectives, or we can find the point such that the linear segment connecting it with the worst outcome point divides the feasible set into two parts of equal area. In the multiobjective optimization literature method (11) is known as the distance based method with the Minkowski-distance. Method (12) is called the general Nash bargaining solution, and the three concepts mentioned afterwards are known as the Kalai-Smorodinsky, the equal sacrifice, and the area monotonic solutions.

Block 8 shows the implementation of the results. The actual optimization procedure, which is problem dependent, provides the optimal values of the decision variables. The corresponding output/state variable values as well as all relevant numerical consequences have to be computed. In addition directions are given to the decision makers to the practical implementation of the optimal solutions.

Figure 4:
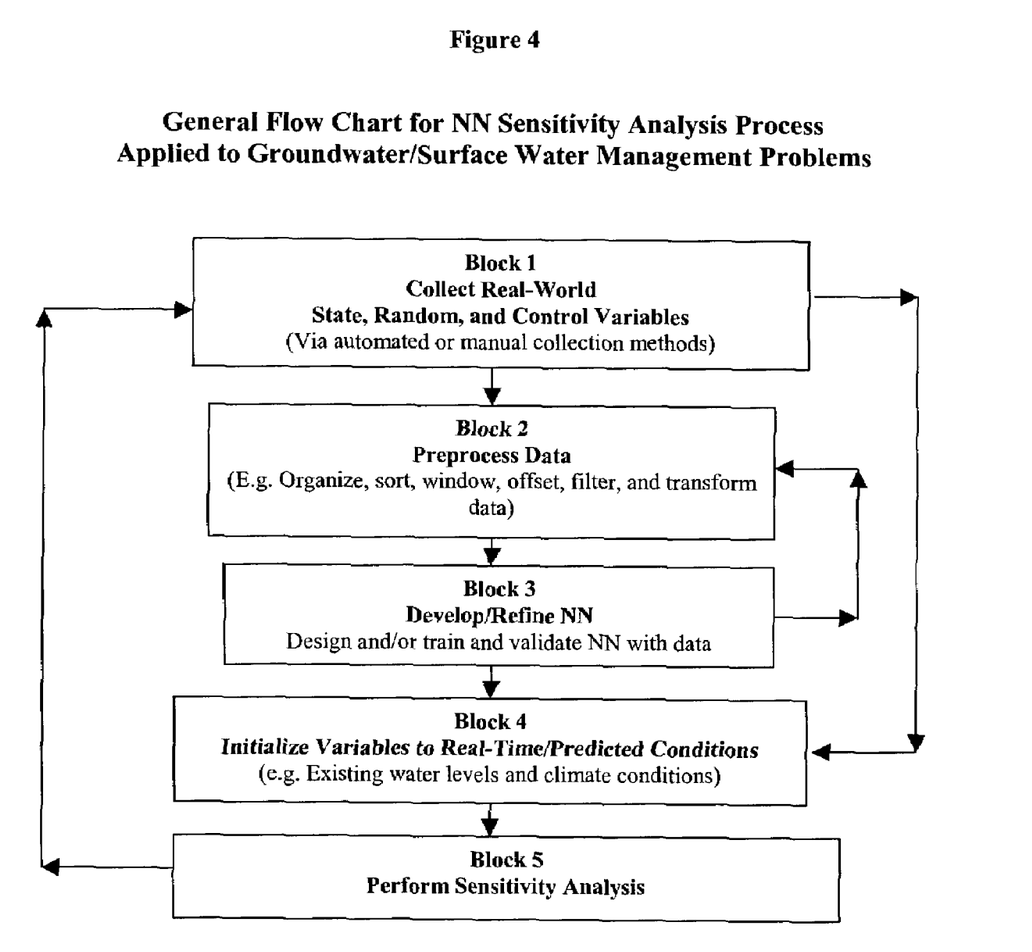
FIG. 4 is a schematic illustration of an apparatus and its operation for providing sensitivity analysis of input and output variables designed for use with a groundwater, surface water system, according to the principles of the present invention.

FIG. 4 illustrates certain basic principles of a system or method of the present invention, for sensitivity analysis.

Blocks 1 through, 4 are the same as discussed for FIG. 2 with identical interrelations.

Block 5 shows the procedure when an output variable is calculated by using all input variables as well as without a particular variable. The comparison of the results shows the sensitivity of the output variable with respect to the selected input. Systematically, selected input nodes are eliminated or disabled in the NN and the NN output/state variables are recomputed. A comparison in predictive accuracy achieved with the complete NN and the incomplete NN is then performed. From this, the relative importance of each input variable on each output variable can be assessed and quantified. Note the feedback loop to collecting real-world data and repeating the sensitivity analysis. As the system changes over time, the sensitivity of output/state to different inputs may also change. For example, a recently dry river may increase the effect of a pumping well on the aquifer at a location near the dry river.

The utility of using a NN for conducting a sensitivity analysis for better understanding the physical relationships between input and output/state variables in a hydrologic system was demonstrated for the multilayered hydraulically connected sand and limestone aquifer system in the test cases discussed earlier. Groundwater levels are monitored in both aquifers with monitoring wells, and public supply wells are screened in the deeper leaky aquifer. A NN was trained to predict the final groundwater levels in both aquifers (output) as a function of the inputs, consisting of pumping rates, initial groundwater levels, and precipitation. The sensitivity analysis determined that pumping most affected groundwater levels in the deeper aquifer. Conversely, the sensitivity analysis demonstrated that water levels in the shallow aquifer are most affected by precipitation rather than pumping. Additionally, the analysis was used to determine the degree of influence that each pumping well has on groundwater levels at each location. This could be particularly critical in hard rock systems, where interconnections between different fractures are important for understanding the hydrogeologic framework.

Although the examples given here pertain to predicting groundwater output/states, the predictive accuracy of the NN has also been demonstrated for surface water systems. For example, the water levels in a series of springs in Florida and streamflows in New Jersey were accurately predicted using the NN approach. In addition, time-varying chloride concentrations associated with saltwater upconing induced by pumping of a coastal aquifer in Massachusetts were accurately predicted with a NN.

In light of the foregoing, it is believed the important contributions that result from a method and apparatus constructed, or practiced, according to the principles of the present invention, can be readily appreciated.

Accordingly, the foregoing detailed description provides a method and apparatus, based on the use of a neural network, and one exemplary example of such a method and apparatus, for (a) predicting important groundwater/surface water related output/state variables, (b) optimizing groundwater/surface water related control variables, and/or (c) sensitivity analysis to identify physical relationships between input and output/state variables for the groundwater/surface water system or to analyze the performance parameters of the neural network. With the foregoing disclosure in mind, the manner in which the principles of the present invention can be applied to the construction and/or practice of various types of groundwater/surface water systems, will be apparent to those in the art.

The invention claimed is:

1. A method of providing transition equations for an optimization procedure for a groundwater or surface water system, comprising the steps of (a) providing a trained neural network that has been trained with real world data for the groundwater or surface water system, which real world data includes time dependent variables that may change over stress periods and comprises state and control variables for the groundwater or surface water system, the trained neural network being interfaced to an automated on-line data system that provides real time input to the trained neural network, (b) configuring the trained neural network to produce transition equations that can be used as any or all of function routines and constraints in the optimization procedure, (c) initializing time dependent variables that are input to the transition equations of the trained neural network from the automated on-line data system to real time conditions for an initial stress period and running the optimization procedure to compute the optimal values of the control variables and their predicted effect on the system over the initial stress period, and (d) using the optimal values to control the system in the most effective or appropriate manner, given the objectives and constraints of the system.

2. A method as set forth by claim 1, wherein the step of running the optimization procedure includes computing the optimal values of the control variables and their predicted effect on the system over the initial stress period and for consecutive selected stress periods, each of predetermined length.

3. A method as set forth by claim 2, further including using the time dependent variables from the last of the consecutive stress periods to reinitialize the transition equations and to perform steps (c) and (d) for a subsequent stress period.

4. A method of providing transition equations for an optimization procedure for a groundwater or surface water system, comprising the steps of:
(a) providing a trained neural network that has been trained with real-world data for the groundwater or surface water system, which real world data includes time dependent variables that may change over stress periods and comprises state and control variables for the groundwater or surface water system, the trained neural network being interfaced to an automated on-line data system that provides real time input to the trained neural network,
(b) configuring the trained neural network to produce transition equations that can be coupled or combined with interpolation equations in the optimization procedure,
(c) initializing time dependent variables that are input to the transition equations of the trained neural network from the automated on-line data system to real time conditions for an initial stress period and running the optimization procedure to compute the optimal values of the control variables and their predicted effect on the system over the initial stress period, and
(d) using the optimal values to control the system in the most effective or appropriate manner, given the objectives and constraints of the system.

5. A method as set forth by claim 4, wherein the step of running the optimization procedure includes computing the optimal values of the control variables and their predicted effect on the system over the initial stress period and for consecutive selected stress periods, each of predetermined length.

6. A method as set forth by claim 5, further including using the time dependent variables from the last of the consecutive stress periods to reinitialize the transition equations and to perform steps (c) and (d) for a subsequent stress period.

7. A method of providing transition equations for an optimization procedure for a groundwater or surface water system, comprising the steps of:

(a) providing a trained neural network that has been trained with real-world data for the groundwater or surface water system, which real world data includes time dependent variables that may change over stress periods and comprises state and control variables for the groundwater or surface water system, the trained neural network being interfaced to an automated on-line data system that provides real time input to the trained neural network, (b) configuring the trained neural network to produce transition equations that can be coupled or combined with physical equations in the optimization procedure, (c) initializing time dependent variables that are input to the transition equations of the trained neural network from the automated on-line data system to real time conditions for an initial stress period and running the optimization procedure to compute the optimal values of the control variables and their predicted effect on the system over the initial stress period, and (d) using the optimal values to control the system in the most effective or appropriate manner, given the objectives and constraints of the system.

8. A method as set forth by claim 7, wherein the step of running the optimization procedure includes computing the optimal values of the control variables and their predicted effect on the system over the initial stress period and for consecutive selected stress periods, each of predetermined length.

9. A method as set forth by claim 8, further including using the time dependent variables from the last of the consecutive stress periods to reinitialize the transition equations and to perform steps (c) and (d) for a subsequent stress period.

* * * * *